June 14, 1949. J. T. RUSSELL 2,472,922
LAWN MOWER GRINDER
Filed April 7, 1947 4 Sheets-Sheet 1
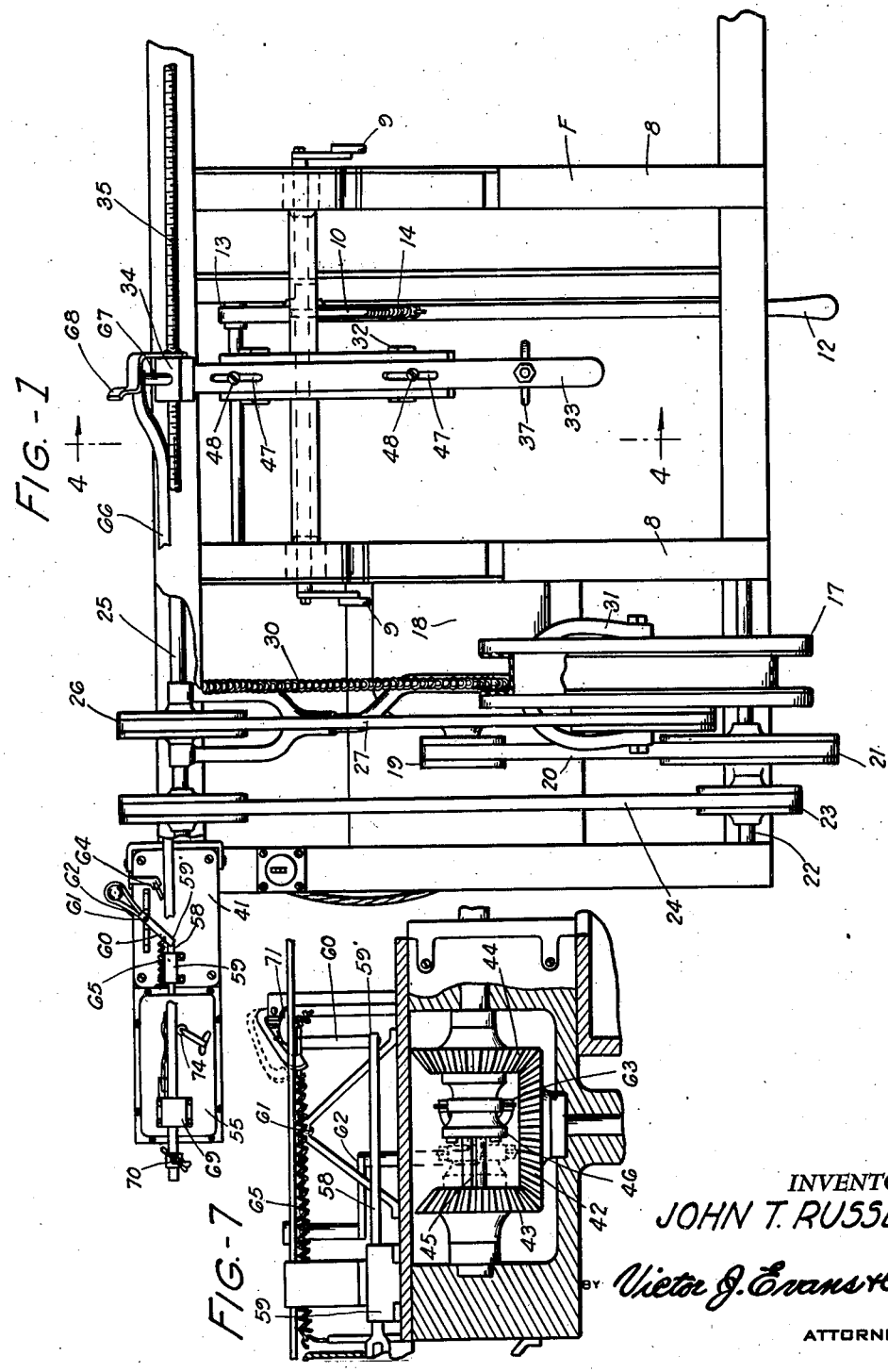
INVENTOR.
JOHN T. RUSSELL
BY *Victor J. Evans & Co.*
ATTORNEYS June 14, 1949.　　J. T. RUSSELL　　2,472,922
LAWN MOWER GRINDER
Filed April 7, 1947　　4 Sheets-Sheet 2
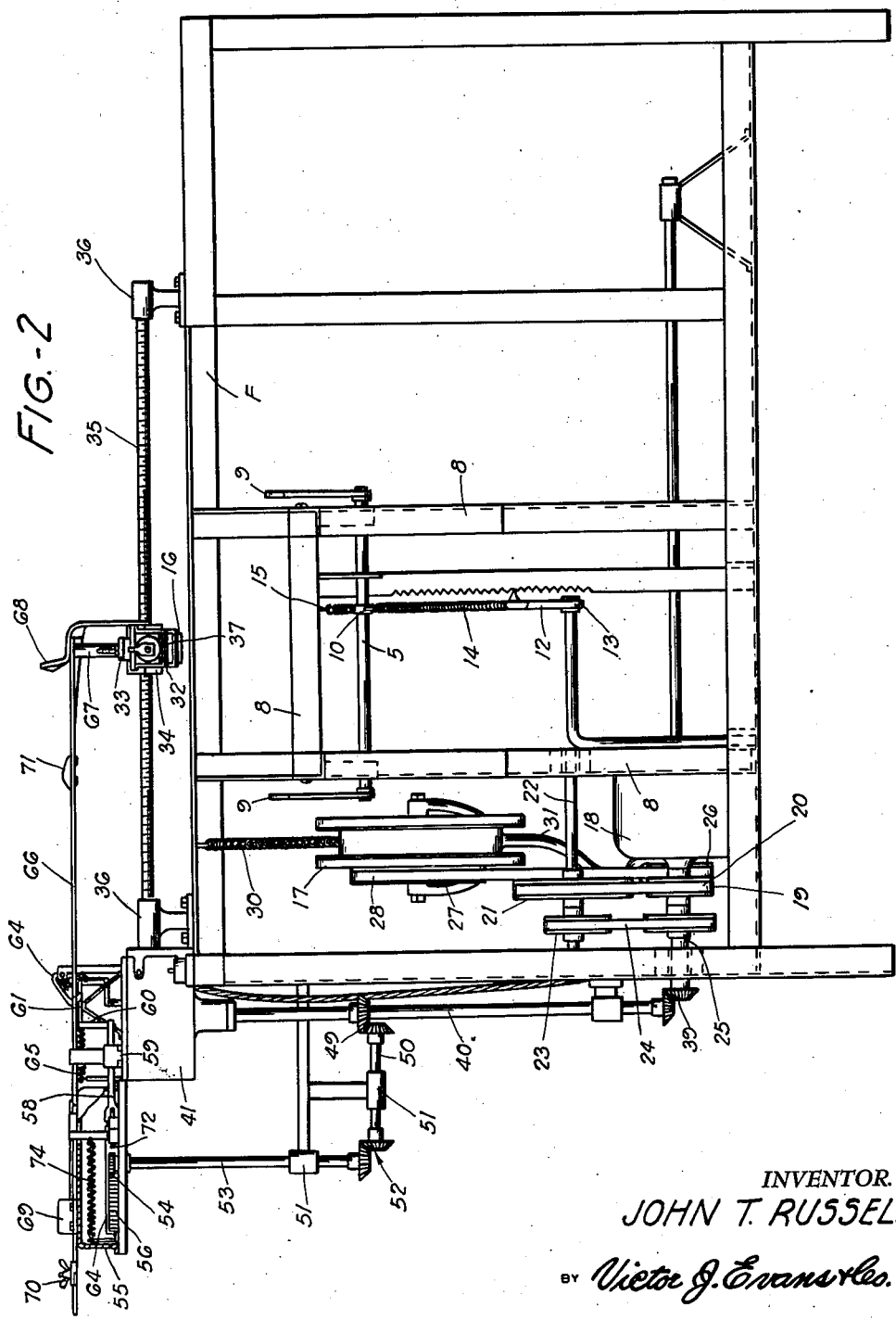
INVENTOR.
JOHN T. RUSSELL
ATTORNEYS June 14, 1949.    J. T. RUSSELL    2,472,922
LAWN MOWER GRINDER
Filed April 7, 1947    4 Sheets-Sheet 3
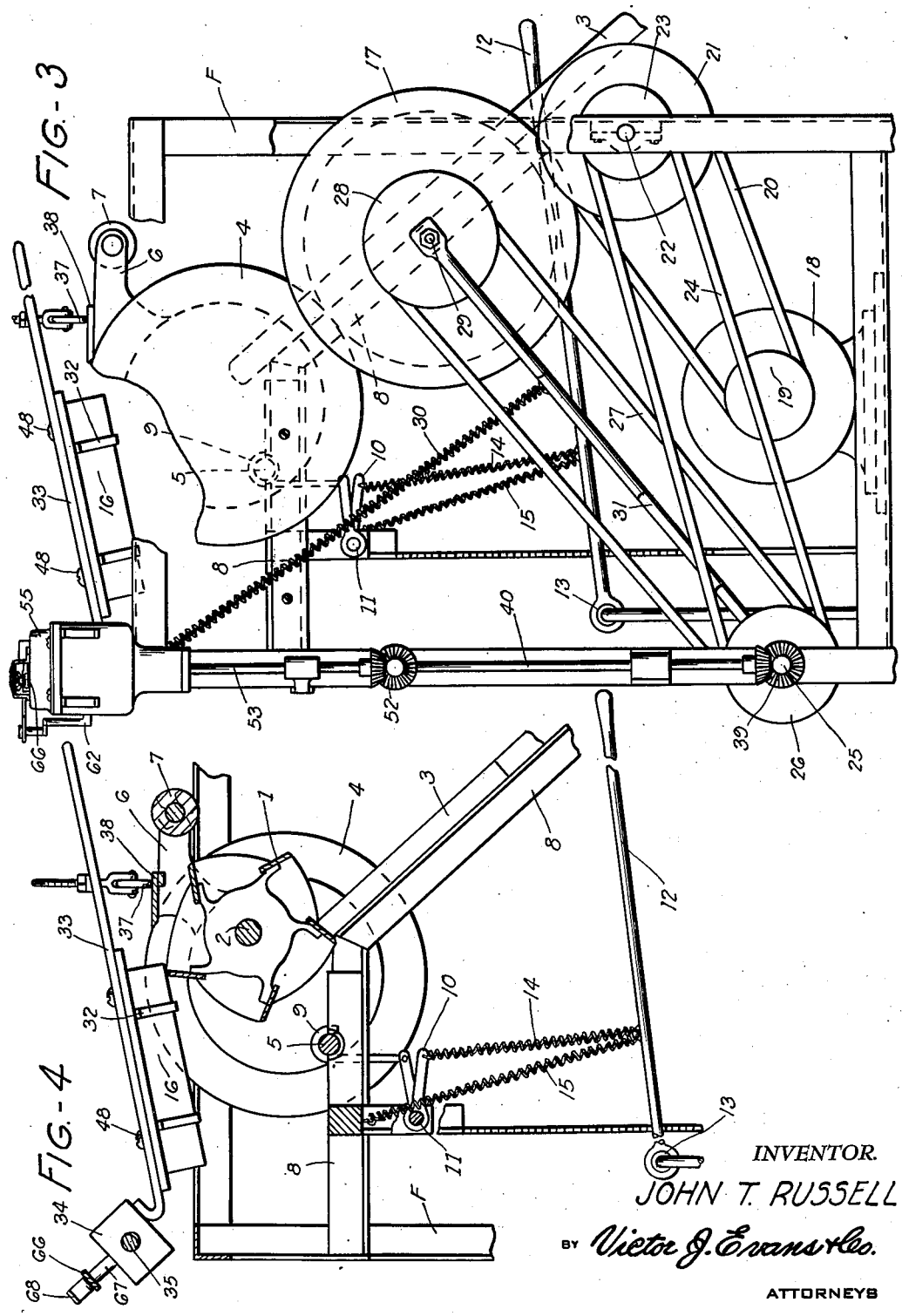
INVENTOR.
JOHN T. RUSSELL
BY Victor J. Evans & Co.
ATTORNEYS

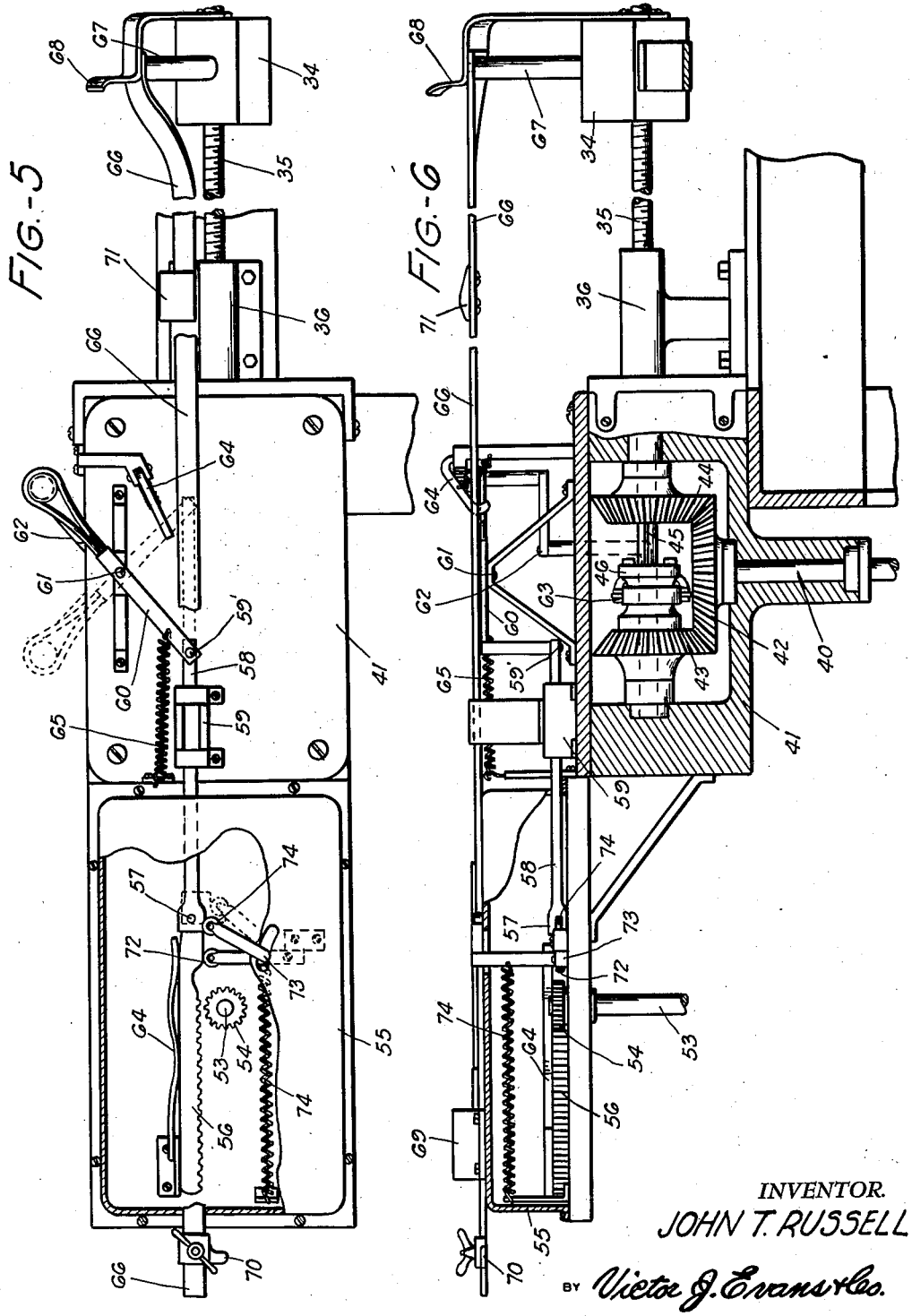

Patented June 14, 1949

2,472,922

UNITED STATES PATENT OFFICE 2,472,922

LAWN MOWER GRINDER

John T. Russell, Oklahoma City, Okla.

Application April 7, 1947, Serial No. 739,798

2 Claims. (Cl. 51—59)

My present invention relates to the general class of power operated abrading machines or grinding machines, and more specifically to an improved lawn mower sharpener or grinder for the spirally arranged blades of a rotary type of lawn mower, and means are provided holding the lawn mower and operating its rotary cutters, in position for co-action with an adjustable grinding tool.

The primary object of the invention is the provision of a machine tool of this type that is composed of a minimum number of parts which may with facility be manufactured with low cost of production and the parts assembled with convenience, to insure a smooth operating machine that is manually controlled, and which is speedy in the performance of its functions, durable, and simple in construction and operation.

The invention consists in certain novel features of construction and combinations and arrangements of parts as will hereinafter be described in detail, and more specifically set forth in the appended claims.

In the accompanying drawings I have illustrated a complete example of a physical embodiment of my invention wherein the parts are combined and arranged in accord with one mode I have devised for the practical application of the principles of my invention. It will, however, be understood that changes and alterations may be made in these exemplifying drawings and mechanical structures within the scope of my claims, without departing from the principles of my invention.

Figure 1 is a view depicting a plan of a motor operated grinding machine in which my invention is embodied.

Figure 2 is a view in front elevation of the grinding machine.

Figure 3 is an end elevation as seen from the left in Fig. 2.

Figure 4 is a detail vertical sectional view showing the manner of mounting the lawn mower in the machine for a grinding operation, as at line 4—4 of Fig. 1.

Figure 5 is an enlarged top plan view, partly broken away showing the reciprocating mechanism of the grinding tool.

Figure 6 is a vertical longitudal sectional view of the structure in Fig. 5; and Figure 7 is a vertical sectional view of parts in Fig. 6.

In order that the general relation and utility of parts of the machine may readily be understood I have shown particularly in Fig. 4 a transverse section through a rotary lawn mower, including the rotary blades 1, and its rotary cutter shaft 2, together with the usual handle 3, traction or power wheel 4 of the mower, and a usual longitudinally extending bolt 5 that unites or ties together the opposite ends of the wheeled mower. In addition to these enumerated parts, a portion of the mower frame is indicated at 6 in which the trailing roller of the mower is journaled and indicated as 7.

The lawn mower to be sharpened is mounted in inverted position in the main frame F of the machine, with the free end of the handle 3 resting on the ground or floor, and the tie rod or post 5 of the mower is supported in spaced bearings of an auxiliary angular supporting frame 8, or work support. For holding down the mower in its supporting bearings hooks 9 are provided to fit over the tie rod or bolt 5 of the mower and the hooks are connected to a rocking yoke 10 that is pivoted at 11 on the auxiliary work frame 8. The hooks are clamped by means of a hand lever 12 having a suitable retaining ratchet or keeper and pivoted at 13, and springs 14 and 15, respectively connect the lever to the rocking yoke and to a portion of the work frame 8.

The lawn mower is thus held rigidly on the work holder or supporting frame 8, in position so that the cutting edges of the spirally arranged blades 1 of the mower may be revolved or rotated beneath a grinding tool or abrading block 16, and the frictional contact between the block and the blades sharpens the cutting edges.

One of the two power or traction wheels 4 of the mower is utilized for transmitting rotary motion to the shaft 2 and blades 1, and the wheel is directly driven by means of a drive pulley 17 which is provided with annular flanges forming a groove for frictional contact with the periphery of the mower wheel 4.

Power for operating the drive wheel is supplied from a suitable source, as an electric motor 18, and speed reduction mechanism is utilized in transmitting rotary motion and power to the drive wheel from a drive wheel 19 of the motor through a belt drive 20 to a larger pulley 21 on countershaft 22 journaled in the main frame. From shaft 22 power is transmitted through pulley 23 and belt 24 to an operating shaft 25 having thereon a drive pulley 26 over which belt 27 passes to and around a final driving pulley 28 that is mounted on shaft 29 with the friction pulley 17.

The friction wheel is resiliently held in frictional contact with the mower wheel 4 by means of a spring 30, which at its upper end is anchored to a part of the frame F, and at its lower end is anchored to a belt-drive frame 31 that is pivoted at its lower end on the operating shaft 25.

The grind stone 16 is mounted by means of straps 32 on the underside of a lever 33 that is provided with a bearing head 34 which is threaded on a horizontal operating screw bar 35 which is journaled in bearings as 36 at the upper or top portion of the main frame F of the machine.

The grind stone is located directly above the mower blades for contact therewith, and means are provided for revolving or rotating the screw bar to cause the grinding device to travel back and forth with relation to the mower while the grind stone is in abrading contact with the blades. As the grind stone is reciprocated by its rotary feed screw bar it is guided or supported by means of a roller 37 journaled on the underside of the lever 33, and the roller travels over a track 38 mounted at the top of the machine and against which the frame 6 of the mower is held.

The feed screw bar 35 is operated by power transmitted from the power shaft 25 through a bevel gear couple 39 and an upright shaft 40 journaled in bearings mounted on one side of the main frame F, and at its upper end the upright shaft enters a gear box 41 in which it is journaled and provided with a bevel gear 42 at its upper end.

The horizontal bevel gear 42 meshes with a pair of spaced pinions 43 and 44 loosely journaled on a smooth extension of the feed screw 35, and the smooth extension or journal end of the screw bar is longitudinally grooved at 45 for co-action with a double-end clutch 46 that is splined on the grooved journal. By this clutch arrangement between the two pinions of the screw bar, the clutch may be shifted at the end of one stroke of the grind stone out of engagement with one pinion and into engagement with the other pinion; the upright shaft 40 revolves in one direction continuously, and the feed screw bar is driven forward and then reversed to reciprocate the grindstone.

To permit adjustment of the grindstone transversely of the cutting blades of the mower the lever 33 is provided with a pair of longitudinally extending slots 47, and bolts 48 passing through the slots to the grindstone are utilized for clamping the grindstone in adjusted position.

The reversing mechanism which shifts the double end clutch between the pinions 43 and 44 for reverse drive of the feed screw derives its power from the upright shaft 40 through a bevel gear couple 49 between shaft 40 and a horizontal pinion shaft 50 journaled in bearings as 51 supported on an auxiliary frame of the machine, and a second bevel gear couple 52 transmits power from the short shaft 50, to an upright rack shaft 53 that is provided with a rack wheel 54 enclosed within a gear housing 55 mounted on a sub-frame forming a side extension of the main frame F of the machine.

As an operating part in the reversing mechanism of the clutch 46 the rack wheel 54 is designed to move to the right in Fig. 5 a rack bar 56, which is pivoted at 57 to an alined sliding link 58 mounted in bearings 59, and the link is pivoted at 59 to one end of a clutch lever 60 that is pivoted at 61 and is provided with an angular arm 62 that enters through a slot in the gear casing 41 and is connected with the fork 63 of the clutch.

For a reversing stroke of the rack bar 56 it is pressed into engagement with the pinion 54 by a flat leaf spring 64 located in the casing 55 so that the revolving pinion 54 will move the rack bar, link 58, and the operating arm of the lever 60 to the right, as indicated by dotted lines, to shift the clutch. In this position of the clutch lever it is caught and retained by a spring latch 64 pivotally mounted on top of the gear casing 41, and when later this latch is withdrawn from the clutch lever, the lever is retracted by means of a spring 65 to automatically shift the clutch for another rotation of the screw feed bar.

For governing and controlling the clutch reversing mechanism a control rod 66 is mounted on a post 67 of the tool carrier and a handle frame 68 is employed to support the rod on the carrier. The rod is located above the two gear boxes or housings 41 and 55, and it is guided in slide bearings as 69 on the housing 55 and provided with an adjustable stop 70 mounted thereon. The control rod travels and reciprocates with the tool carrier and it is provided on its upper face with a cam 71 that contacts with the spring latch 64 to lift the latch and release the clutch lever at the end of the left hand working stroke of the tool and its carrier.

When the clutch lever is released its spring 65 swings the lever to full line position in Fig. 5 which movement reverses the clutch and thereby starts the tool carrier on its right hand working stroke.

During this right hand stroke the rack bar 56 is held out of engagement with its operating pinion 54 by a roller detent 72 pivoted at 73 within the housing 55, which detent is held by spring 74; and a second roller detent 74 also pivoted at 73, but located on top of the slotted top plate of the housing, is contacted by a lug on the control bar 66 to release the roller detent 72 and thus permit the spring 64 to press the rack bar into engagement with the rack pinion 54, for the purpose described.

In operation, the machine grinds the lawn mower blades from the back of the blade to the cutting edge, instead of grinding against the cutting edge, which would result in damaging the cutting edge of the blade. To accomplish this manner of grinding, the mower blades revolve backward against the grinding stone, which is exactly the reverse of most grinding machines in operation at the present time.

It is believed that from the foregoing description, the structure and operation of the device will be apparent to those skilled in the art.

Having thus fully described my invention, what I claim as new and desire to secure by Letters Patent is:

1. In a power operated machine for grinding the blades of a rotary lawn mower having a traction wheel rotatable with the blades, the combination with a main frame, means for rigidly mounting a mower in the frame, and power transmission for revolving the blades, of a reciprocal carrier mounted in the frame and a power actuated screw bar operatively engaging said carrier for reciprocating the carrier, a grinding tool mounted in the carrier in fixed relation thereto and disposed transversely of the blades for contact therewith, means for holding the tool to its work, a track on the frame parallel to, and below, the line of travel of the carrier and a roller adjustably secured to said carrier and engaging in said track for guiding and supporting the reciprocating tool, and said power transmission mechanism comprises an operating wheel in frictional engagement with said traction wheel, a drive frame having a pivoted support in the main frame and a shaft journalled therein for the operating wheel, and resilient means co-acting with the drive frame for holding the operating wheel in operative relation to the traction wheel.

2. The invention as in claim 1 wherein there is provided power-transmission mechanism for rotating the screw bar including spaced reversing gears on the bar and an intermediate drive gear, a shiftable clutch on the screw bar between said gears, and means actuated by the reciprocable carrier for shifting the clutch.

JOHN T. RUSSELL.

REFERENCES CITED

The following references are of record in the file of this patent:

UNITED STATES PATENTS

| Number | Name | Date |
| --- | --- | --- |
| 1,227,775 | Friess | May 29, 1917 |
| 1,285,825 | Springer | Nov. 26, 1918 |
| 1,383,091 | Fernside | June 28, 1921 |
| 1,967,118 | Glasgow | July 17, 1934 |
| 2,149,774 | Ingleman | Mar. 7, 1939 |
| 2,187,289 | Utterback | Jan. 16, 1940 |
| 2,264,918 | Smith et al. | Dec. 2, 1941 |
| 2,314,945 | Maynard et al. | Mar. 30, 1943 |